United States Patent [19]

Sauvageau

[11] Patent Number: 4,790,478
[45] Date of Patent: Dec. 13, 1988

[54] GREENHOUSE HEATING BY MEANS OF IMMERSED WATER-BED (BASIN)

[76] Inventor: Yvan Sauvageau, 69 des lauriers, Bezoeil, Canada, J3G 3E2

[21] Appl. No.: 88,114

[22] Filed: Aug. 21, 1987

[30] Foreign Application Priority Data

Jul. 15, 1986 [CA] Canada .................................. 1207727

[51] Int. Cl.[4] .............................................. A01G 9/00
[52] U.S. Cl. ........................................ 237/69; 165/45; 47/17
[58] Field of Search ............... 237/69, 56, 8 R; 47/17; 165/45; 62/260, 324.1

[56] References Cited

U.S. PATENT DOCUMENTS 4,286,574 9/1981 Vrolyk et al. ......................... 165/45

FOREIGN PATENT DOCUMENTS 2278042 2/1976 France .................................. 237/69

Primary Examiner—Henry A. Bennet

[57] ABSTRACT

A method of heating a greenhouse by means of an immersed water-bed (basin) which act as a heat radiator sit underneath the complete surface of the cultural soil; this immersed water-bed (basin) filled with gravel is heated by means of hot water or steam heating coil.

3 Claims, 1 Drawing Sheet

GREENHOUSE HEATING BY MEANS OF IMMERSED WATER-BED (BASIN)

BACKGROUND OF THE INVENTION

1. Field of the Invention

The present invention is a greenhouse heating system by means of the ground. The inconvenience of heating the ground with tubes is; the small area of heating and isolation of tubes due to dry ground around it. This can be avoided by heating the layer of soil underneath with the help of an immersed basin of gravel. Care, however, should be taken to insulate both layers with a plastic film. The porosity of the gravel permits to maintain a good quantity of water and this serves as a heating element. This has for advantage to heat the soil by an area of exchange equivalent to the area of the greenhouse. The temperature of the heating element is itself maintained at an acceptable level and does not contribute to the drying of the soil.

The bulk of heated water imprisonned in the gravel constitutes an excellent heat sink which permits the system to be less rapidly affected by heating failures.

2. Description of the Prior Art

The most simple and widespread technique to effectively heat greenhouses by means of the ground, is to incorporate tubes through which circulates hot water or steam. The ground thus heated transmits its heat to the atmosphere and assures the maintenance of ideal conditions for cultivation.

With such a system, an unusual situation has a tendancy to appear: the entire area of heat exchange being small, the temperature of the heating water should be high, which has the effect of drying the ground closest to the tubes. This dried soil acts as insulation and to continue to furnish the greenhouse with the same amount of energy, the temperature of the heating water has to be increased. The higher this temperature is increased, the more the soil will dry. This phenomenon repeats itself until the system loses its effectiveness. Moreover, this means of heating does not have enough inertia and should it fail, the temperature of the greenhouse will rapidly diminish.

Unfortunately, the prior Art has taught no satisfactory method to use thermal storage as large area heat radiator.

U.S. Pat. No. 4,286,574 issued 9/1981 to Vrolyk et Al teaches a thermal storage system. However in this system the thermal storage is not used as a heat radiator.

Foreign Pat. No. 2,278,042 issued 2/72 France to Dalle teaches a thermal storage system using plastic tubes mounted onto panel which can lay on the ground in the greenhouse floor. The thermal storage is not used as heating element (radiator) covering the floor area of the greenhouse.

SUMMARY

It is a known fact that greenhouse heating at ground level is done by way of underground tubes through which circulates hot water or steam.

Room atmosphere of the greenhouse is thus maintained at an adequate temperature by heat radiation stemming from the ground.

With this invention, the soil to be heated is deposited on a plastic surface. Under this surface, we find a heated intermediate; consisting of a certain thickness of gravel completely immersed and contained in an impervious area. The water which is found between the chinks of gravel comes in contact with the lower surface of the plastic, is itself heated by tybes through which circulates hot water. The ground is thus in contact with a heating element covering a large area.

Several advantages result from this: the temperature of the intermediate heater does not have to be too high permitting a better control of soil humidity and obtaining a more effective transfer of heat.

This invention will rectify the main flaw of the conventional heating systems which dries the ground around the tubes to the point where an insulating layer forms around them.

DESCRIPTION OF THE PREFERRED EMBODIMENTS

Figure 1:
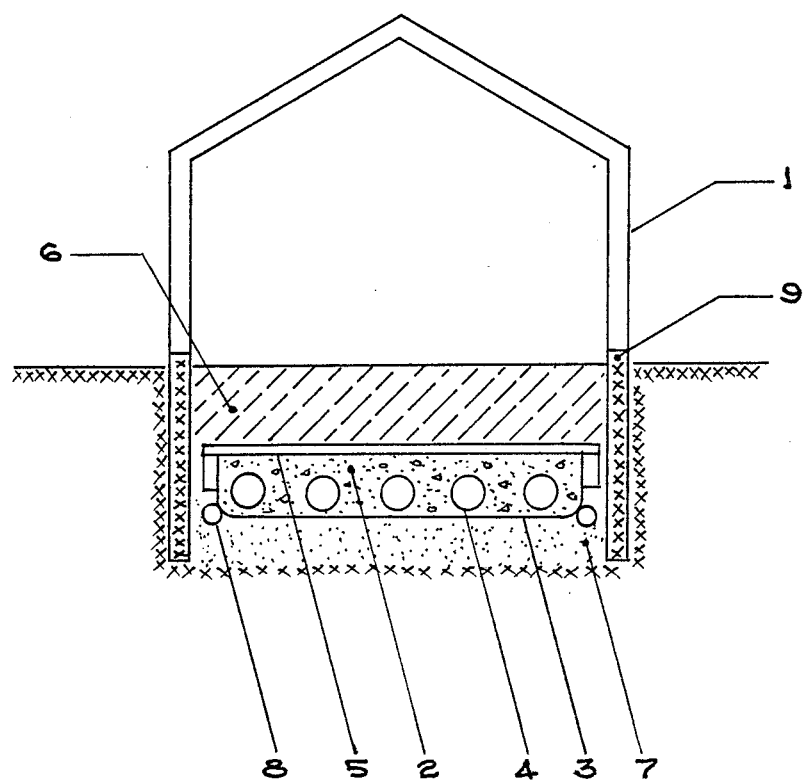
FIG. 1. is a diagrammatic represation of a greenhouse with the heat radiator by means of immersed water bed (basin).

The greenhouse illustrated in FIG. 1 is made up of the following elements:

The structure of the greenhouse (1) can be varied as the present heating system patent may be integrated into most installations.

The bed of gravel (2) or other compatible materials assures two functions;

the first is to contain hot liquid which will reheat the soil (6) suitable for cultivation of the greenhouse, the second is to insure a solid and stable base of support for the layer of soil. Gravel of medium size chinks should be used. Free space between the chinks of elements of gravel will be taken up by water or other liquid which constitutes a heat transfer liquid. The liquid level in the basin is equally maintained with the upper area of gravel, with the help of a simple level detector.

The impervious envelope (3) is obligatory in order to avoid the loss of heated water contained in the gravel from infiltrating into the ground layer. This envelope should be a waterproof canvas or plastic of sufficient thickness to avoid any perforation, and lay on 2 inches of sand (7).

The heating liquid contained in the basin will be maintained at its operational temperature by a heating coil (4) placed on the bottom of the bed of gravel. Hot water or steam coming from an interior system circulates through this coil; an electric element may also be used.

The transfer of heat is always very good as it is an exchange system; liquid-water or liquid-steam. The piping may be plastic, copper or any other material, according to the budget available.

The soil suitable for cultivation and the immersed basin bed should be insulated, one to the other, by a thin waterproof canvas (tarpaulin) or a plastic sheet (5). The heated water enters in contact with the lower area of the canvas or plastic film and transmits its heat to the soil placed on top.

The bed of gravel should be spread in such a way that the canvas or sheet of plastic is higher in the middle than on the sides. The weak dome thus formed permits drainage, from the sides, of possible over-watering, into the drainage pipe, (8).

In regard to insulation (9), this element is not essential to the functioning of the heating system but is included because it is highly recommended.

The accomplishment of an invention, reasons for which the exclusive right of property or privilege is asserted, are defined as follows:

I claim:

1. A system for heating a greenhouse from the ground comprises of, a bed of soil suitable for cultivation, an impervious envelope situated under the said bed of soil suitable for cultivation in which a bed of gravel or other compatible material is immersed in a liquid heat conductor, along with a heating coil, situated on the inside of the impervious envelope under the said bed of gravel which serves to heat the gravel and the liquid in such a way that this combination of the two heats the bed of soil suitable for cultivation by means of heat exchange.

2. A heating system as defined in claim 1 in which the liquid heat conductor is water.

3. A heating system as defined in claims 1 or 2 in which the temperature of the heating coil is maintained by means of hot water, steam or electric heating elements.

* * * * *